United States Patent
Dering et al.

[11] Patent Number: 6,055,775
[45] Date of Patent: May 2, 2000

[54] LIFTGATE SELF-CLOSING DEVICE

[75] Inventors: Timothy Dering, Rochester Hills; Kyle Montgomery, Clawson; Michael Dettling, Clarkston, all of Mich.

[73] Assignee: DaimlerChrysler Corporation, Auburn Hills, Mich.

[21] Appl. No.: 09/335,085

[22] Filed: Jun. 17, 1999

[51] Int. Cl.[7] .............................. E05F 11/24; B62D 25/00
[52] U.S. Cl. .................................. 49/340; 49/341; 296/56
[58] Field of Search .............................. 49/339, 340, 341, 49/343, 336, 362, 139, 140; 296/56, 146.8; 74/625, 89.18

[56] References Cited

U.S. PATENT DOCUMENTS

| | | |
|---|---|---|
| 3,713,472 | 1/1973 | Dozois . |
| 3,716,945 | 2/1973 | Cooper et al. . |
| 4,903,435 | 2/1990 | Bittmann et al. . |
| 4,967,510 | 11/1990 | Torii et al. ................................. 49/362 |
| 4,979,261 | 12/1990 | Lasier et al. .............................. 49/340 |
| 5,448,856 | 9/1995 | Moore et al. .............................. 49/340 |
| 5,449,212 | 9/1995 | Seifert . |
| 5,477,642 | 12/1995 | Legendre . |
| 5,507,120 | 4/1996 | Current . |
| 5,513,467 | 5/1996 | Current et al. . |
| 5,531,498 | 7/1996 | Kowall . |
| 5,588,258 | 12/1996 | Wright et al. . |
| 5,630,637 | 5/1997 | Sauri ......................................... 296/56 |
| 5,851,050 | 12/1998 | Squire et al. . |
| 5,896,703 | 4/1999 | Wright et al. ............................. 49/339 |

Primary Examiner—Daniel P. Stodola
Assistant Examiner—Curtis A. Cohen
Attorney, Agent, or Firm—Mark P. Calcaterra

[57] ABSTRACT

A liftgate self-closing device for a vehicle includes a power drive unit and a track drive member drivingly interconnected with the power drive unit. The power drive unit selectively drives the track drive member. A pneumatic actuator is pivotally coupled at one end to the liftgate and at the other end to the track drive member. The actuator exerts a force opposing retraction of the liftgate. The power drive unit is operable in a first and a second direction. The first direction of the power drive unit drives the track drive member such that the pneumatic actuator is lowered to a predetermined position to enable the liftgate to automatically close. The second direction of the power drive unit drives the track drive member in an opposite direction such that the pneumatic actuator is raised to a predetermined position to enable the liftgate to be opened by an operator.

18 Claims, 2 Drawing Sheets

LIFTGATE SELF-CLOSING DEVICE

CROSS-REFERENCE TO RELATED APPLICATIONS

The present application is related to the following co-pending U.S. Patent Applications, which are incorporated herein by reference:

U.S. Ser. No. 09/335,350 for an invention entitled "POWER LIFTGATE ARM ASSIST ASSEMBLY"; and U.S. Ser. No. 09/335,065 for an invention entitled "POWER LIFTGATE DEVICE".

FIELD OF THE INVENTION

The present invention relates to a liftgate of a vehicle and, more particularly, to a powered liftgate assembly capable of remotely closing the liftgate of the vehicle.

BACKGROUND OF THE INVENTION

Recently, sport-utility vehicles and minivans have become increasingly popular among automobile consumers. Such vehicles include large cargo areas that provide increased hauling capability relative to conventional passenger vehicles. To maximize the accessibility to these cargo areas, many vehicles are equipped with a liftgate or cargo door located at the rear of the vehicle. Typically, these liftgates are pivotally attached by hinges to the top of the cargo opening. The cargo opening is defined by the roof and rear pillars of the vehicle. To gain access to the cargo area, these liftgates commonly pivot upwardly and outwardly from the cargo opening.

In conventional liftgates, pneumatic "actuators" or "cylinders" containing compressed gas are provided on each side of the liftgate. Each pneumatic actuator is attached at one end to the liftgate and at another end to the corresponding pillar of the vehicle. When the liftgate is closed and latched, the pneumatic actuators are contracted and the gas within the actuators is compressed. When the liftgate is unlatched, the stored energy provided by the compressed gas in the pneumatic actuators forces the liftgate to open partially, thereby releasing the liftgate from the lock. The liftgate must then be manually lifted while the pneumatic actuators continue to exert an outward force on the liftgate that assists the manual opening of the liftgate. Eventually, the liftgate is manually lifted to a position where the geometric relationship of the pneumatic actuators relative to the liftgate is such that the moment arms of the pneumatic actuators are sufficiently large to enable the actuators to take over lifting the liftgate and retain the liftgate in a fully opening position. More particularly, the pivoting dynamics of the liftgate are a function of:

1) the force exerted by the pneumatic actuators ($F_a$);
2) the distance between the vector force of the pneumatic actuators and the liftgate pivot axis (d);
3) the weight of the liftgate ($F_g$); and
4) the distance of the liftgate center of gravity and the liftgate pivot axis (D).

The product of $F_a$ and d equals the moment force of the actuators. The product of $F_g$ and D equals the moment force of gravity acting on the liftgate. It should be appreciated that the force due to gravity and the force exerted by the actuators vary relative to the position of the liftgate.

It should be appreciated to one skilled in the art that the above conventional design includes an "overcenter condition." This condition provides a "center" position in which the moment exerted by the actuators is equal to the moment exerted by the weight of the liftgate. At a position above the "center" position, the upward moment forces the liftgate open. At a position below the "center" position, the downward moment overcomes the upward moment, thereby allowing the liftgate to generally close. It should be appreciated that due to the size of conventional liftgates and the force exerted by the actuators, closing the liftgate prior to the "center" position may be awkward and difficult. Furthermore, for many operators, it may be difficult to reach a fully raised liftgate for closure thereof.

Attempts have been made to provide hydraulic and/or cable driven systems to automatically open or close the liftgate of a vehicle. However, various disadvantages are associated with these types of systems. For example, but not limited to, the hydraulic type system requires expensive and cumbersome hydraulic pumps and actuators. Furthermore, these pumps and actuators are typically difficult to install due to their size and complexity and are generally located at a distance away from the liftgate mechanism. Likewise, cable type systems may be unreliable due to the exposure of the cable and pulleys to environmental contamination and the like.

Accordingly, there exists a need in the relevant art to provide a liftgate self-closing device that is capable of remotely closing the liftgate of a vehicle. Furthermore, there exists a need in the relevant art to provide a liftgate self-closing device that is capable of being manually overridden by an operator. Moreover, there exists a need in the relevant art to provide a liftgate self-closing device that overcomes the disadvantages of the prior art.

SUMMARY OF THE INVENTION

In accordance with the broad teachings of this invention, a liftgate self-closing device for a vehicle having an advantageous construction is provided. The liftgate self-closing device includes a power drive unit and a track drive member drivingly interconnected with the power drive unit. The power drive unit selectively drives the track drive member. A pneumatic actuator is pivotally coupled at one end to the liftgate and at the other end to the track drive member. The actuator exerts a force opposing retraction of the liftgate. The power drive unit is operable in a first and a second direction. The first direction of the power drive unit drives the track drive member such that the pneumatic actuator is lowered to a predetermined position to enable the liftgate to automatically close. The second direction of the power drive unit drives the track drive member in an opposite direction such that the pneumatic actuator is raised to a predetermined position to enable the liftgate to be opened by an operator.

Further areas of applicability of the present invention will become apparent from the detailed description provided hereinafter. It should be understood that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment is merely exemplary in nature and is in no way intended to limit the invention, its application, or uses.

Figure 1:
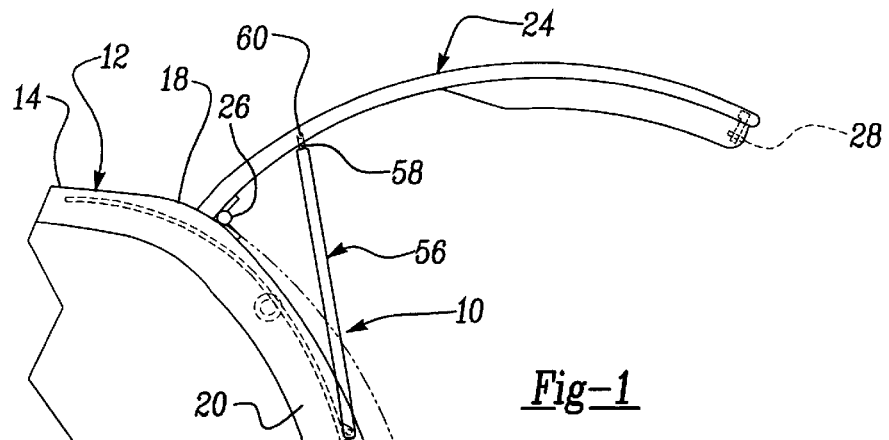
FIG. 1 is an interior side view of a motor vehicle employing a liftgate self-closing device according to the teachings of the present invention.

Referring to the drawings, a liftgate self-closing device 10 is provided in accordance with the teaching of the present invention. Liftgate self-closing device 10 is disposed within a vehicle 12, such as a sport-utility vehicle or minivan. Vehicle 12 includes a main body 14 having a cargo-opening frame 16. Cargo opening frame 16 is generally defined by a roof 18, a pair of D-pillars 20, and a floor surface 22. Vehicle 12 further includes a liftgate or cargo door 24 pivotally mounted to cargo opening frame 16 by a pair of laterally spaced hinges 26 (only one shown). Liftgate 24 includes a latch mechanism 28 adapted to cooperate with a striker 30 opposingly mounted to vehicle 12. Latch mechanism 28 selectively retains liftgate 24 in a closed and locked position (shown in phantom in FIG. 1).

A pair of liftgate self-closing devices 10 is preferably disposed within or adjacent to opposing D-pillars 20 of vehicle 12. It should be appreciated that these liftgate self-closing devices are mirror images of each other and function substantially the same; therefore, in the interest of brevity, only one liftgate self-closing device will be described in detail.

Figure 2:
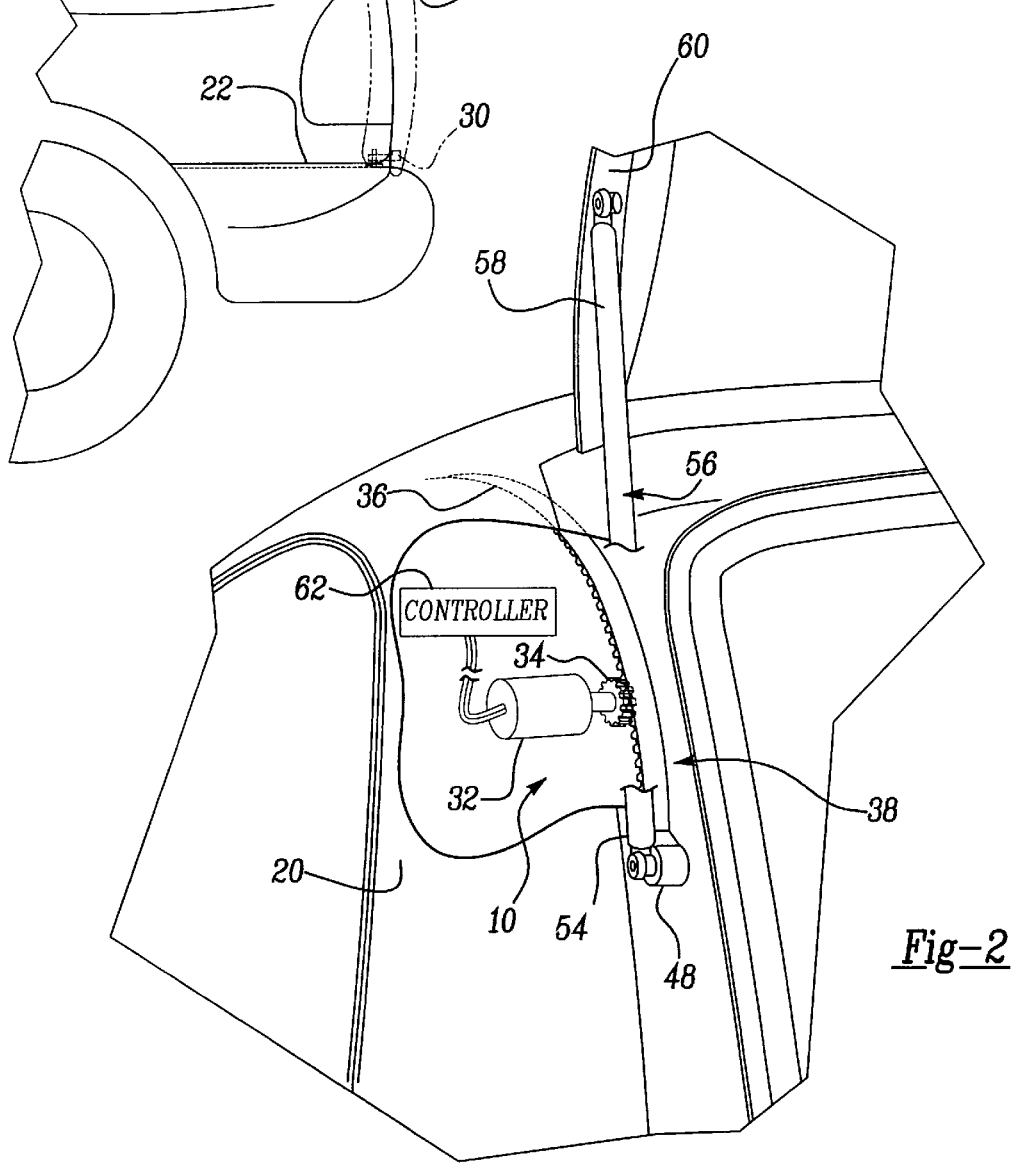
FIG. 2 is a cut-away perspective view of the liftgate self-closing device having a section of the D-pillar removed for clarity.

Referring to FIG. 2, liftgate self-closing device 10 includes a reversible electric motor 32 that drives a driven gear 34. Driven gear 34 in turn drives a track drive member or tape 36, which will be described in detail below. Reversible electric motor 32 is preferably disposed within D-pillar 20 of vehicle 12 such that the longitudinal axis of motor 32 is generally perpendicular to tape 36. Motor 32 is mounted to D-pillar 20 by known means (not shown), such as a screw.

Figure 3:
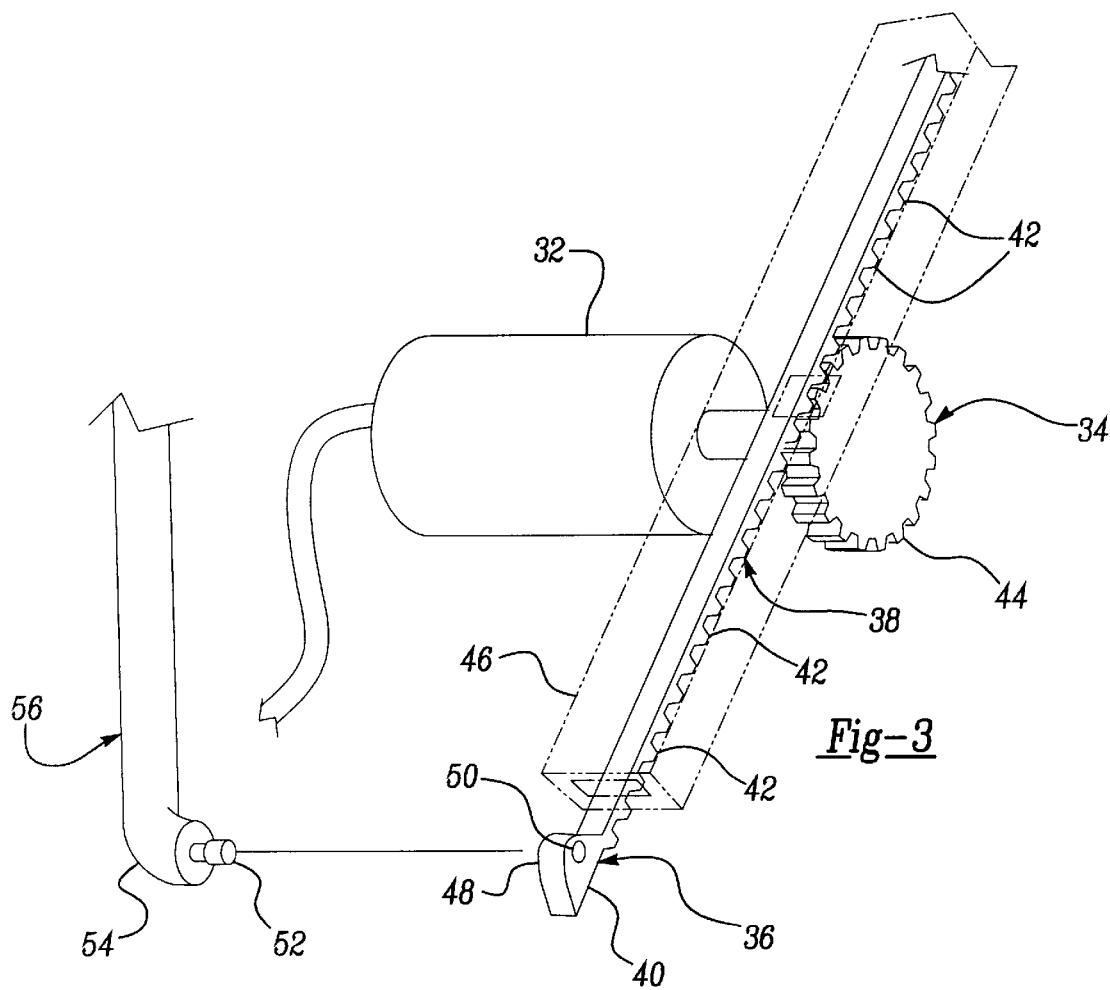
FIG. 3 is a partial perspective view of the liftgate self-closing device having the elongated tape member.
Figure 4:
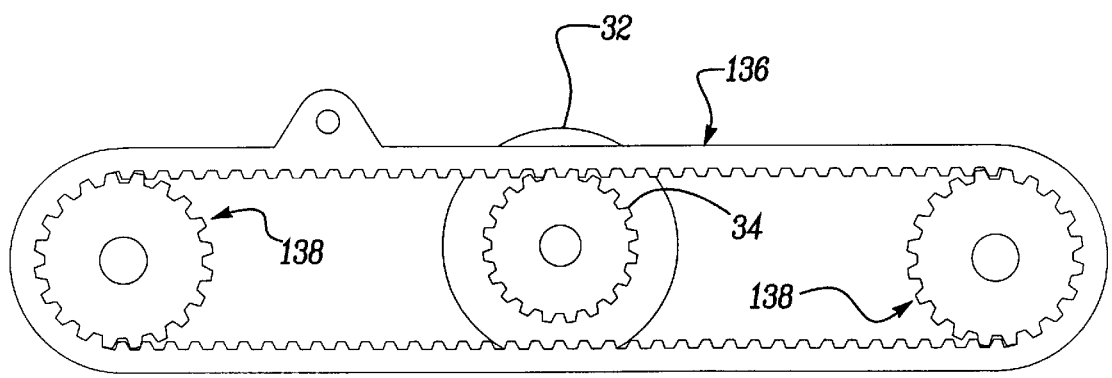
FIG. 4 is a partial perspective view of the liftgate self-closing device having the continuous tape member.

As best seen in FIG. 3, tape 36 is a generally elongated belt member having a rack 38 formed on an underside 40. Rack 38 is comprised of a plurality of teeth 42. The plurality of teeth 42 are sized to cooperate with a plurality of gear teeth 44 formed on driven gear 34. Tape 36 is preferably an elongated member disposed in a track 46 (FIG. 3); however, tape 36 may be an endless member, generally designated at 136 in FIG. 4. It should be noted that tape 136 further requires a pair of opposing idler gears 138 for maintaining the proper alignment of tape 136.

Tape 36, 136 further includes a generally raised portion 48 having an aperture 50 formed therethrough. Aperture 50 is adapted to receive a pin 52 extending from a first end 54 of a pneumatic actuator or cylinder 56 to enable pivotal movement between tape 36 and pneumatic actuator 56. Pin 52 is retained in aperture 50 by known means, such as a snap fit or retaining pin. Pneumatic actuator 56 is pivotally coupled at a second end 58 (FIG. 1) to an upper inner portion 60 of liftgate 24. Pneumatic actuator 56 normally biases liftgate 24 in an outward direction. That is, pneumatic actuator 56 normally opposes retraction of liftgate 24. Pneumatic actuator 56 produces an "overcenter condition" in liftgate 24 to aid in the opening of liftgate 24.

It should be appreciated that the liftgate self-closing device of the present invention may be disposed on either the wet or the dry side of the liftgate seal. Preferably, the liftgate self-closing device is disposed on the dry side of the liftgate seal to prevent contaminants from effecting the operation thereof.

During operation, liftgate 24 is opened in a conventional manner. That is, latch mechanism 30 is released to permit liftgate 24 to pivot upward relative to cargo opening 16. Pneumatic actuators 56 drive liftgate 24 from latch mechanism 30, thereby initiating the opening of liftgate 24. An operator then manually opens liftgate 24 until the "overcenter" condition is achieved in pneumatic actuators 56, which causes liftgate 24 to continue to open automatically. To close liftgate 24, a signal is sent to a controller 62 to close liftgate 24 of vehicle 12. Motor 32 drives driven gear 34 in a counter-clockwise direction (FIGS. 3 and 4), thereby driving tape 38 and pneumatic actuator 56 downward. Motor 34 continues to drive tape 38 and actuator 56 downward until a predetermined position. At this position, the moment force of liftgate 24 is greater than the moment force of actuators 56, thereby enabling liftgate 24 to automatically close under the force of gravity. Liftgate 24 continues downward until striker 30 engages latch mechanism 28. Preferably, latch mechanism 28 is of the kind that draws liftgate 24 inward until a fully closed and locked position is achieved. Upon completion of liftgate closure, motor 34 is driven in a clockwise direction to drive tape 38 and pneumatic actuator 56 upward. This movement compresses actuators 56 to a fully compressed state. This fully compressed state is required for aiding the operator in opening liftgate 24 the next time.

In the event the operator wishes to close liftgate 24 manually, actuators 56 are in the raised position and, thus, liftgate 24 may be closed in a conventional manner. That is, the operator simply pulls liftgate 24 downward, thereby compressing actuators 56 and effecting closure of liftgate 24.

The liftgate self-closing device of the present invention is thus capable of remotely and automatically closing liftgate 24 to minimize work required by the operator. Furthermore, the liftgate self-closing device of the present invention is capable of being simply and conveniently overridden by an operator.

The invention being thus described, it will be obvious that the same may be varied in many ways. Such variations are not to be regarded as a departure from the spirit and scope of the invention. Such variations or modifications, as would be obvious to one skilled in the art, are intended to be included within the scope of the following claims.

What is claimed is:

1. A liftgate self-closing device for a liftgate of a vehicle, said device comprising:

a power drive unit;

a track drive member having a plurality of teeth drivingly interconnected with said power drive unit such that said power drive unit selectively drives said track drive member; and a pneumatic actuator adapted to be pivotally coupled at one end to the liftgate and pivotally coupled at the other end to said track drive member, said actuator exerting a force for opposing retraction of the liftgate, wherein said power drive unit drives said track drive member and said pneumatic actuator in a direction thereby decompressing said pneumatic actuator to enable the liftgate to close under the force of gravity, said power drive unit further drives said track drive member and said pneumatic actuator in an opposite direction thereby compressing said pneumatic actuator to enable the liftgate to be operated manually.

2. The device according to claim 1 wherein said power drive unit is an electrically driven, reversible motor.

3. The device according to claim 1, further comprising:
a driven gear operably coupled with said power drive unit, said driven gear engaging said plurality of teeth.

4. The device according to claim 1 wherein said track drive member is an elongated member having a first and a second end.

5. The device according to claim 1 wherein said track drive member is a continuous member.

6. The device according to claim 5, further comprising:
a pair of idler gears for rotatably supporting said continuous member.

7. The device according to claim 1 wherein said track drive member is formed of a flexible material.

8. A powered liftgate for a vehicle, comprising:
a liftgate adapted to be pivotally attached to the vehicle, said liftgate being positionable in an opened or closed position;
a power drive unit adapted to be mounted to the vehicle;
a tape member having a plurality of teeth drivingly interconnected with said power drive unit such that said power drive unit selectively drives said tape member; and
a pneumatic actuator pivotally coupled at one end to said liftgate and at the other end to said tape member, said actuator exerting a force opposing retraction of the liftgate,
wherein said power drive unit driving said tape member and said pneumatic actuator in a direction thereby decompressing said pneumatic actuator and enabling said liftgate to close under the force of gravity, said power drive unit further drives said tape member and said pneumatic actuator in an opposite direction thereby compressing said pneumatic actuator to enable the liftgate to be operated manually.

9. The liftgate according to claim 8 wherein said power drive unit is an electrically driven, reversible motor.

10. The device according to claim 8, further comprising:
a driven gear operably coupled with said power drive unit, said driven gear engaging said plurality of teeth.

11. The device according to claim 8 wherein said tape member is an elongated member having a first and a second end.

12. The device according to claim 8 wherein said tape member is a continuous member.

13. The device according to claim 12, further comprising:
a pair of idler gears for rotatably supporting said continuous member.

14. The device according to claim 8 wherein said tape member is formed of a flexible material.

15. A powered liftgate for a vehicle, comprising:
a liftgate adapted to be pivotally attached to the vehicle, said liftgate being positionable in an opened or closed position;
an electrically driven, reversible motor adapted to be mounted to the vehicle, said motor having a driven gear operably coupled thereto;
a flexible track member having a plurality of teeth, said plurality of teeth being in enmeshing relationship with said driven gear of said motor such that said motor selectively drives said track member; and
a pneumatic actuator pivotally coupled at one end to said liftgate and at the other end to said track member, said actuator exerting a force opposing retraction of the liftgate,
wherein said motor drives said track member and said pneumatic actuator in first direction thereby decompressing said pneumatic actuator and enabling said liftgate to close under the force of gravity, said motor further drives said track member and said pneumatic actuator in an opposite direction thereby compressing said pneumatic actuator to enable said liftgate to be operated manually.

16. The device according to claim 15 wherein said track member is an elongated member having a first and a second end.

17. The device according to claim 15 wherein said track member is a continuous member.

18. The device according to claim 17, further comprising:
a pair of idler gears for rotatably supporting said continuous member.

* * * * *